United States Patent Office 3,063,954
Patented Nov. 13, 1962

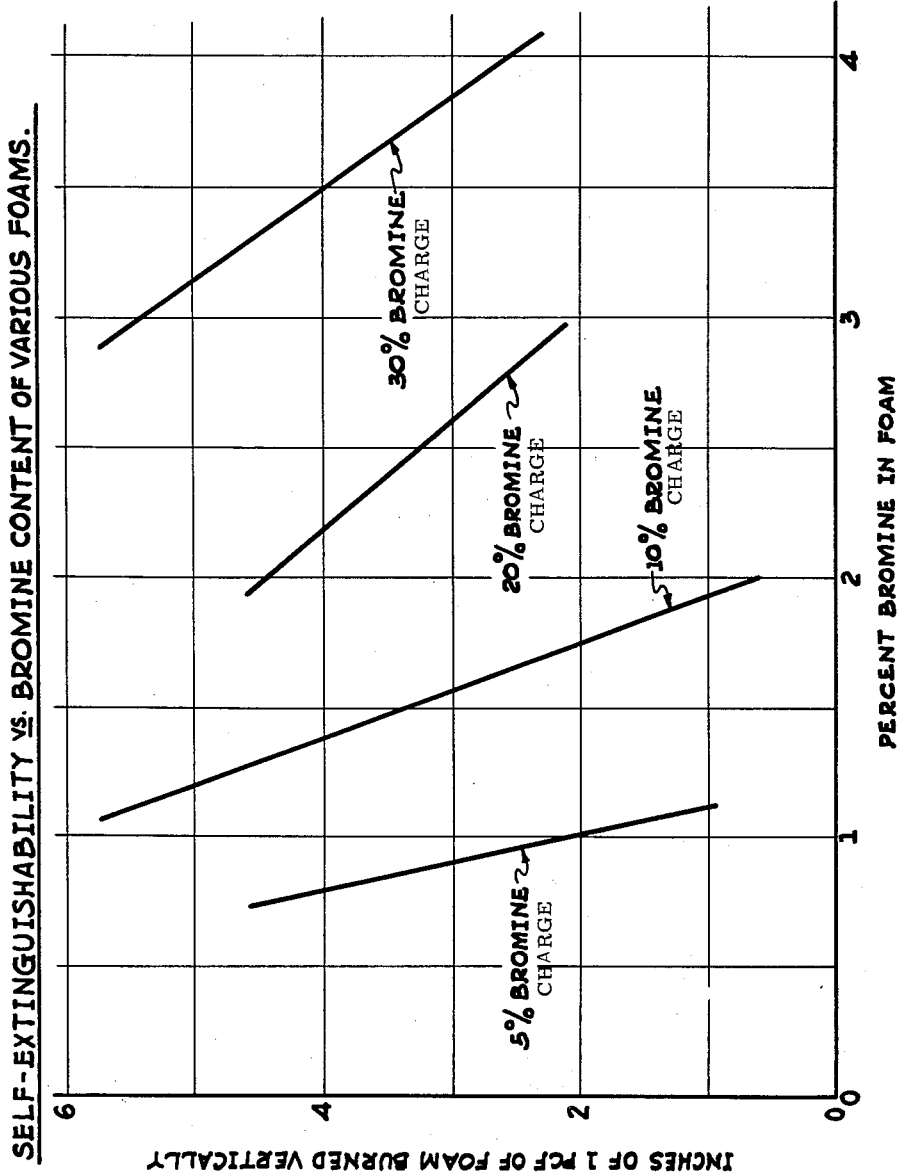

3,063,954
PROCESS FOR PRODUCING FLAME-RETARDANT EXPANDABLE POLYSTYRENE PARTICLES
Eugene V. Galizia, Mars, Pa., assignor to Koppers Company, Inc., a corporation of Delaware
Filed Oct. 25, 1960, Ser. No. 64,753
4 Claims. (Cl. 260—2.5)

This invention generally relates to a method of making flame-retardant polymers and more particularly to a method of making flame-retardant polymers of styrene, alone or in combination with other comonomers, and of producing foam structures therefrom.

Foam polystyrene is a light weight mass possessing a closed cell structure and has a density of from 0.5 to 10 lbs. per cubic foot or higher. Foam polystyrene is useful for the production of shaped articles of all sizes and shapes. Typical products are refrigerator and other type insulation, floats, pontoons, boat parts, toys and novelties.

Polystyrene foam objects are generally produced by expanding and molding under the influence of heat, which may be supplied by steam, hot water, high frequency or infrared radiation, polystyrene beads which contain blowing agents such as volatile hydrocarbons. These beads are available from commercial producers such as Dow Chemical Company and Koppers Company, Inc. The latter company produces several grades which are sold under the tradename "Dylite" expandable polystyrene.

Foam polystyrene has many excellent physical properties which make it desirable for a wide variety of uses. In a typical sample of foam polystyrene of 3 lbs. per cubic foot density the tensile strength at 73° F. is 67 lbs. per square inch, the compressive strength is 45 p.s.i. and the fluctural strength is 100 p.s.i. Foam polystyrene also has excellent thermal properties. For instance, the thermal conductivity or K factor [B.t.u./(hr.) (sq. ft.) (° F./in.)] of a 3 lb. per cubic foot sample is about 0.243. The material also has an extremely low rate of water absorption. For instance, a specimen immersed for 48 hours under a hydrostatic pressure equivalent to 10 feet of water absorbs less than 0.9% by volume of water. Similarly, the rate of water vapor transmission is low. A 3 lb. per cubic foot sample will transmit about 5.0 grams per 24 hours per square meter of surface area.

Unfortunately, however, in spite of this useful combination of desirable properties, expandable polystyrene cannot be used in any application where flammability would be a problem since it burns with relative ease. There are many applications in the building industry where the unique combination of properties of this low cost material would make it desirable if there were no flammability hazard.

There has been an effort, therefore, to develop a flame-retardant polystyrene so that the useful properties of foam polystyrene might be used in those applications where fire-retardant properties are important, but these improvements in flame retardant properties have been accompanied by undesirable characteristics such as a loss in molding properties.

By flame retardant is meant that a polymer once ignited will not continue to burn an appreciable amount once the source of ignition is removed. A polymer is regarded as being fire retardant when a strip of the foam 6" x 1" x ½" will not burn more than 3 inches if tested according to the following procedure. The strip is held in a vertical position and the bottom end of it is exposed to a ¾ inch yellow Bunsen flame for a time sufficient to burn ¼ inch of the sample; the flame is then removed, and the sample allowed to burn. Where flame retardancy is of any importance, the sample should not burn more than 2½ inches, and preferably, less than 2 inches. Samples of foam polystyrene used in the test results shown hereinafter were aged to remove any volatile blowing agent present, i.e. either at room temperature for a week or under vacuum for 6 hours at 60° C.

An effective method has been to brominate polystyrene beads, render them expandable and thereafter mold them. Such a method is described in copending application Serial No. 856,895, "Low Density Self-Extinguishing Polymeric Material" by A. R. Ingram, which application is assigned to assignee of the present application. This method, although it imparts excellent fire-retardant properties to the polystyrene beads, is somewhat deficient in that the molding properties of the beads are adversely affected. Particularly, the bead-to-bead fusion in foams of less than 1.5 lbs./ft. density is inferior to that of foam made from identical beads which are not brominated. This is believed to be due to the fact that the brominated polystyrene on the surface of the beads is more hydrophilic and also has different flow characteristics than the polystyrene in the interior of the beads.

It is, therefore, an object of this invention to overcome these previous deficiencies and to produce an expandable polystyrene which, in addition to excellent fire-retardant properties, also possesses increased moldability.

In accordance with this invention I have found that flame-retardant polymers of styrene alone or in combination with other copolymerizable monomers having excellent molding properties and which may be further fabricated into foam can be prepared by dissolving in a monomer a previously prepared halogenated polymer to obtain a solution, which solution is polymerized by suspension polymerization to obtain beads which may then be further treated by impregnating them with a hydrocarbon to render them expandable under the application of heat.

The brominated beads, which are dissolved in styrene monomer and repolymerized to give the final product, are prepared by brominating previously prepared polystyrene beads. The beads themselves may be prepared by any of the known polymerization processes capable of yielding beads. One such process, a suspension polymerization process, is that described in U.S. Patent No. 2,907,756, K. W. Doak, wherein styrene monomer in water in the presence of a catalyst system of t-butyl perbenzoate and benzoyl peroxide is polymerized at a fixed time-temperature cycle. Other processes that yield beads or particles may also be used. These beads are then halogenated by any of the known methods of the art. A particularly effective method is that described in copending application Serial No. 856,895, now U.S. Patent No. 3,039,977 "Low Density Self-Extinguishing Polymeric Material," A. R. Ingram, which application is assigned to the assignee of the present application. Briefly, the process of application Serial No. 856,895 contemplates suspending the polymer beads at a temperature of from 40–120° C. in an aqueous medium containing at least 1.5% by weight of bromine based on the weight of the particles and activating the bromine by generation of free radicals until the color of the medium changes from orange to pale yellow. The suspending system may contain 5–40 parts per 100 parts of said particles of a water-soluble metal salt of an acid that is at least as strong as carbonic acid to reduce the amount of water absorbed by the beads. The beads are then recovered and dissolved in additional styrene in an amount to give a bromine content that is particularly desired. This solution is then polymerized in aqueous suspension.

Advantageously, the halogens used in the practice of this invention are chlorine and bromine; the latter is particularly desirable since the degree of flame retardance imparted per unit of bromine present is higher than that imparted by chlorine.

The minimum amount of halogen needed to render the final polystyrene flame-retardant to any desired degree varies with and is dependent upon the amount of halogen in the halogen-containing beads which is also called the master batch. The lower the halogen content of the master batch, the lower the total amount of halogen required in the final product to obtain an equivalent degree of fire retardancy. It has been found that as little as 0.5% by weight of bromine is useful. Although quite large amounts of halogen may be used, comparatively small improvement in flame retardancy is experienced by increasing the halogen in the case of bromine above about 2.5%. From a commercial point of view, optimum results and cost savings are obtained by preparing a master batch in the range of from 3.5 to about 7% by weight of bromine. This master batch is then diluted by dissolving it in sufficient additional monomer so that the final product has a bromine content of between 0.7 and 2.0 weight percent and then polymerizing the resulting solution.

The single sheet of drawing is a graphic representation of the flame retardancy of various bromine-containing polystyrene foams.

The varying amounts of bromine required to give comparable fire retardancy is graphically illustrated in the single sheet of drawing. In the drawing master batches were prepared by adding to 100 parts of polystyrene beads 5, 10, 20, and 30 parts of bromine along with an amount of potassium persulfate equimolar to the bromine. These master batches were then diluted with sufficient styrene to yield polymers of the indicated bromine content and the flame retardancy determined. Details of the experimental procedure are given in Examples I and II.

The polymerization of the solution of brominated polystyrene in styrene monomer is carried out in a suspension system of any known type; for example, such a system as that mentioned above, United States Patent No. 2,907,756. At the completion of polymerization the beads are rendered expandable. This may be done either in the same tank or the beads may be first separated, sized and resuspended. This impregnation process which is more fully described in copending application Serial No. 394,230, G. F. D'Alelio, assigned to the assignee of the present invention, now U.S. Patent No. 2,983,692 consists of suspending the beads in water and a suspending agent in the presence of from 7 to 11% by weight of the beads of a normally liquid hydrocarbon blowing agent which boils in the range of from 28-70° C. until they absorb sufficient hydrocarbon to render them expandable. At the completion of impregnation the beads are recovered, washed and dried. They may thereafter be processed in any of the usual production techniques such as stationary molding or extrusion. The resulting foam produced from beads of this type, however, is particularly useful in the preparation of building panels. This molding process may be conveniently carried out in the apparatus described in copending application Serial No. 752,235, E. A. Edberg assigned to the assignee of the present invention.

The following examples more fully illustrate the practice of the present invention.

EXAMPLE I

A. *Preparation of Halongenated Beads*

The brominated polystyrene beads were prepared by suspending 100 parts of polystyrene beads (prepared according to the process United States Patent No. 2,907,756; average molecular weight, 300,000, monomer content, 0.15% particle size, 90% through a 10-mesh and on a 30-mesh sieve) in a suspending system which consisted of 150 parts of water, 17 parts of potassium persulfate, 25 parts of sodium chloride, 0.15 parts of Nacconal NRSF, 6 parts tricalcium phosphate and 10 parts of bromine. This suspension was heated to 70° C. where it was held for 8 hours and thereafter heated to reflux. A total of 1.87 parts of sodium nitrite as a 10% solution was added incrementally over 30 minutes to decompose residual bromine discharged from the beads during reflux. Reflux was continued for an additional 30 minutes. The beads were decanted and then reslurried with fresh water and salt and then decanted again. They were again reslurried and the pH was adjusted to 4.6 by the addition of tricalcium phosphate. The beads were then recovered by filtration. Without drying, they contained 24% water. A bromine determination was made and the beads were found to contain 4.7% of combined bromine on a dry basis, exclusive of ionic chlorides or bromides.

B. *Polymerization*

Aqueous 29% ammonia in an amount of 150 ml., 8,400 grams of styrene and 5.210 grams of brominated polystyrene beads prepared as above were charged into a 10-gallon reactor and stirred under a nitrogen atmosphere at room temperature for ½ hour. There was then added 18.75 grams of benzoyl peroxide and 18.75 grams of tertiary-butyl perbenzoate. The temperature was raised to 40° C. over a period of 20 minutes during which time the peroxidic initiators dissolved. There was then added 10,200 grams of distilled water, 3,125 grams of sodium chloride and 1,000 ml. of a 2.5% solution of hydroxyethyl cellulose which had as a 1% solution in water a viscosity of 18 cps. Thereafter the temperature was increased over a 75-minute period to 90° C. where it was mintained for 6.5 hours. Up to this time there had also been added incrementally a total of 210 ml. of aqueous 5% sodium hydroxide to maintain the pH of the system within the range of 5.1 to 6.1. Thereafter the polymerization temperature was raised to 115° C. where it was maintained for 4 hours. Heating was then discontinued, and the slurry was colled to 30° C. The pH was determined and found to be 4.8 and this was raised to 5.7 by adding 100 ml. of 5% sodium hydroxide.

C. *Impregnation*

To the above prepared slurry of polystyrene beads 1,060 grams of a 50–50 weight mixture of isopentane and n-pentane was added. The temperature was then raised to 100° C. for 10 hours. Maximum pressure was 92 p.s.i.g. The slurry was then cooled to 30° C. and the beads were separated, washed and dried. The bead size was measured on a Rotap machine and it was found that 94% of the beads were of a diameter between 0.59 and 2.00 mm. A portion of the beads were expanded and molded into 6" x 6" x 2" blocks of 1.0 p.c.f. density. Specimens cut to 6" x 1" x 0.5" were evaluated according to the previously described test and burned between one and two inches. It is also possible to recover the beads at the completion of the polymerization step and mold them into solid (i.e. unexpanded) tensile-test specimens which are self-extinguishing according to the ASTM D–635–56T method of evaluting flammability of rigid plastics.

EXAMPLE II

In order to determine the optimum quantity, that is, the amount at which maximum fire-retardant properties are obtained, previously prepared polystyrene beads were brominated to contain approximately 2.4, 4.7, 9.4 and 13.1% by weight of organically bound bromine. This was accomplished by suspending 100 parts of polystyrene beads as described in Example I–A for 8 hours at 70° C. in a mixture of 150 parts of water, 25 parts of sodium chloride, 0.015 part of Nacconal NRSF, bromine (5, 10, 20 and 30 parts, respectively) and potassium persulfate (8.5, 17, 34 and 51 parts, respectively). After refluxing for one hour in the presence of sufficient added sodium nitrite to eliminate bromine vapors, the beads were recovered by filtration and washed with water. The combined bromine contents by analysis were: 3.0, 4.7, 0.8, and 12.9%, respectively. These recovered beads were then dissolved in varying amounts of styrene monomer in order to obtain polystyrene with the bromine content indicated in the drawing. The pH of the solution was adjusted to 8.6 to 9.4 by admixture of aqua ammonia and then 0.15% each of benzoyl peroxide and tert-butyl perbenzoate was dissolved therein. The polymerizations were in all cases conducted by charging to a 12-ounce beverage bottle 120 ml. of water, 30 g. of sodium chloride, 80 g. of the above solution of brominated polystyrene in styrene, and 8.0 g. of an aqueous solution of 2.5% hydroxyethyl cellulose (Cellosize WP-40). After shaking for one hour, the mixture was adjusted in pH, when necessary, to 7.5–8.6 with additional ammonia. Polymerization was conducted for 8 hours at 90° C. and then 4 hours at 115° C. while the bottles turned end-over-end. At the completion of the polymerization the slurry was cooled to ambient temperature and thereafter impregnated for 10 hours at 100° C. with 6.8 g. (8.5 parts per 100 parts of beads) of a 50–50 weight mixture of isopentane and n-pentane. Thereafter the mixture was cooled, the beads were separated, washed and dried. Portions of each of the above compositions were steam-expanded to a bulk density of 1.0 p.c.f. and then molded into 6" x 6" x 2" blocks at 15 p.s.i.g. steam pressure. Test specimens of 6" x 1" x 0.5" were cut from the blocks, aged to remove excess volatile matter, and then tested for fire retardency. These results are shown on the following table.

SELF-EXTINGUISHING CHARACTERISTICS OF POLYSTYRENE FOAMS PREPARED FROM BEADS OBTAINED BY THE SUSPENSION POLYMERIZATION OF STYRENE SOLUTIONS OF BROMINATED POLYSTYRENE

[Bromination charge in parts of bromine per one hundred parts of polystyrene]

| $Br_2$, 5 p.p.h. | | $Br_2$, 10 p.p.h. | | $Br_2$, 20 p.p.h. | | $Br_2$, 30 p.p.h. | |
| --- | --- | --- | --- | --- | --- | --- | --- |
| Percent Bromine in Foam | Inches[a] Burned | Percent Bromine in Foam | Inches[a] Burned | Percent Bromine in Foam | Inches[a] Burned | Percent Bromine in Foam | Inches[a] Burned |
| .70 | 4.5 | | | | | | |
| .85 | 3.6 | | | | | | |
| .95 | 2.1 | 1.05 | 5.8 | | | | |
| 1.10 | 1.1 | 1.10 | 4.6 | | | | |
| | | 1.20 | 5.0 | | | | |
| | | 1.30 | 4.0 | | | | |
| | | 1.35 | 4.9 | | | | |
| | | 1.45 | 3.9 | | | | |
| | | 1.50 | 4.1 | | | | |
| | | 1.60 | 2.3 | | | | |
| | | 1.70 | 1.6 | | | | |
| | | 1.90 | 1.1 | 2.0 | 4.4 | | |
| | | 2.10 | .8 | 2.8 | 2.5 | | |
| | | | | | | 3.2 | 4.8 |
| | | | | | | 4.0 | 2.5 |

[a] Foam specimens, 6" x 1" x 0.5," of one p.c.f. density were heated for 6 hours in vacuo at 60° C. until residual volatile content was less than 2.0%. The "inches burned" is the average result of igniting fire specimens in a vertical position until one-fourth inch is consumed and then withdrawing the flame.

EXAMPLE III

Example I was repeated except that an 85–15 mixture of styrene and beta vinyl naphthalene was substituted for the styrene used therein. The recovered beads were molded and found to have excellent fire retardent properties.

The foregoing has described a novel and highly desirable process for producing expandable polymeric particles which are self-extinguishing and flame-retardant. The process of this invention offers an improved method for obtaining these materials which are finding a large scale application in the building industry.

I claim:

1. A process for producing flame-retardant expandable polystyrene particles comprising forming an aqueous suspension of a solution of styrene monomer and brominated polystyrene whose bromine content is sufficient to yield upon polymerization of said solution a polystyrene having a bromine content of at least 0.5% by weight, polymerizing said solution to substantial completeness by heating said suspension to produce a system of particles of bromine-containing-polystyrene in an aqueous medium, adding a volatile hydrocarbon having a boiling point between 25 and 90° C. to said system, heating said system under pressure to cause said hydrocarbon to be incorporated into said particles whereby said particles are rendered expandable under the influence of heat, and thereafter recovering said particles.

2. A process for producing flame-retardant expandable polymer particles comprising forming an aqueous suspension of a solution of a monomer selected from the group consisting of styrene and monomers other than styrene copolymerizable with styrene and a halogenated polymer, the monomer of said halogenated polymer being copolymerizable with styrene and the halogen content of said halogenated polymer being sufficient to yield upon polymerization of said solution a polymer having a halogen content of at least 0.5% by weight, polymerizing said solution to substantial completeness by heating said suspension to produce a system of particles of halogen-containing-polymer in an aqueous medium, adding a volatile hydrocarbon having a boiling point between 25 and 90° C. to said system, heating said system under pressure to cause said hydrocarbons to be incorporated in said particles whereby said particles are rendered expandable under the influence of heat, and thereafter recovering said particles.

3. The process of claim 2 wherein the halogen is bromine.

4. A process for producing flame-retardant expandable polymeric particles comprising polymerizing by suspension polymerization in the presence of a water soluble metal salt of an acid at least as strong as carbonic acid, styrene monomer which has dissolved therein a halogenated polystyrene having a halogen content sufficient to yield a polystyrene having a halogen content of at least 0.5% by weight after completion of polymerization, rendering said halogenated polystyrene particles expandable by impregnating them with a volatile normally liquid hydrocarbon having a boiling point between 25° C. and 90° C. and thereafter recovering said self-extinguishing flame-retardant polystyrene particles.

References Cited in the file of this patent

UNITED STATES PATENTS

| 2,681,321 | Stastny et al. | June 15, 1954 |
| 2,744,291 | Stastny et al. | May 8, 1956 |

FOREIGN PATENTS

| 778,761 | Great Britain | July 10, 1957 |